United States Patent
Priel et al.

(10) Patent No.: US 9,075,421 B2
(45) Date of Patent: Jul. 7, 2015

(54) INTEGRATED CIRCUIT DEVICE, VOLTAGE REGULATOR MODULE AND METHOD FOR COMPENSATING A VOLTAGE SIGNAL

(75) Inventors: Michael Priel, Netanya (IL); Leonid Fleshel, Hertzelia (IL); Sergey Sofer, Rishon Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/116,785

(22) PCT Filed: May 27, 2011

(86) PCT No.: PCT/IB2011/052333
§ 371 (c)(1),
(2), (4) Date: Nov. 11, 2013

(87) PCT Pub. No.: WO2012/164344
PCT Pub. Date: Dec. 6, 2012

(65) Prior Publication Data
US 2014/0176220 A1    Jun. 26, 2014

(51) Int. Cl.
*G05F 1/46* (2006.01)
*G06F 1/26* (2006.01)

(52) U.S. Cl.
CPC ... *G05F 1/46* (2013.01); *G06F 1/26* (2013.01)

(58) Field of Classification Search
USPC .............................. 327/534–537, 326, 534–53
See application file for complete search history.

(56) References Cited

U.S. PATENT DOCUMENTS

| | | | |
|---|---|---|---|
| 5,319,302 A | 6/1994 | Hara et al. | |
| 6,040,639 A | 3/2000 | Ginell et al. | |
| 6,538,497 B2 | 3/2003 | Thomas et al. | |
| 6,806,763 B2 | 10/2004 | Kim et al. | |
| 7,589,563 B2 | 9/2009 | Luo | |
| 7,667,447 B2 | 2/2010 | Huang et al. | |
| 7,728,569 B1 | 6/2010 | Le et al. | |
| 7,733,678 B1 | 6/2010 | Notohamiprodjo et al. | |
| 2005/0134220 A1* | 6/2005 | Brohlin et al. | 320/128 |
| 2006/0197513 A1 | 9/2006 | Tang et al. | |
| 2008/0088286 A1 | 4/2008 | Cho et al. | |
| 2008/0231243 A1 | 9/2008 | Zhong et al. | |
| 2009/0224737 A1 | 9/2009 | Lou | |
| 2010/0066326 A1 | 3/2010 | Huang | |
| 2010/0253314 A1 | 10/2010 | Bitting | |

FOREIGN PATENT DOCUMENTS

JP          05021738      1/1993
WO     2007057725 A1     5/2007

OTHER PUBLICATIONS

International Search Report and Written Opinion correlating to PCT/IB2011/052333 dated Feb. 28, 2012.

* cited by examiner

*Primary Examiner* — Dinh Le

(57) ABSTRACT

An integrated circuit device comprising at least one voltage supply module arranged to receive at an input thereof at least one control signal and to provide at an output thereof a voltage signal in accordance with the received at least one control signal, and at least one control module comprising at least one feedback loop between the output of the at least one voltage supply module and the input of the at least one voltage supply module, and arranged to generate the at least one control signal based at least partly on the voltage level of the voltage signal output by the at least one voltage supply module. The at least one control module is further arranged to receive at an input thereof at least one instantaneous indication of a load current at the output of the at least one voltage supply module, and apply a compensation to the at least one control signal provided to the at least one voltage supply module based at least partly on the received at least one indication of the load current.

20 Claims, 4 Drawing Sheets

INTEGRATED CIRCUIT DEVICE, VOLTAGE REGULATOR MODULE AND METHOD FOR COMPENSATING A VOLTAGE SIGNAL

FIELD OF THE INVENTION

The field of this invention relates to an integrated circuit device, voltage regulator module and method for compensating a voltage signal output by a voltage supply module.

BACKGROUND OF THE INVENTION

In the field of modern integrated circuit devices, and in particular in the field of integrated circuit devices for mobile or wireless applications, there is often a trade-off between reducing power consumption whilst increasing performance. In order to accommodate both requirements sufficiently, it is necessary to implement 'on-chip' power management. A critical part of such on-chip power management is the use of voltage regulators.

In order to achieve a maximum operating frequency for an integrated circuit device, accurate voltage control is necessary, which requires high accuracy voltage regulators. By providing an on-chip regulator with good feedback of the relevant output voltage, a high degree of accuracy is typically achievable for the supplied voltage. However, inaccuracy in the output voltage can still occur, for example due to abrupt load changes that cause ripples in output voltage.

One method for compensating for such high load changes is to implement a high comparator gain within the voltage regulator. However, such a high comparator gain impacts the system stability, in particular at low load current states, and thus is undesirable. Some known solutions propose implementing different regulator modes, whereby the different modes of the regulator provide, for example, better stability at lower load current states and better response times at higher load current states. However, in practice it is typically not possible to reliably distinguish between the states in a real system, thereby resulting in improper operation of the regulator.

SUMMARY OF THE INVENTION

The present invention provides an integrated circuit device, a voltage regulator module and a method for compensating a voltage signal output by a voltage supply module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
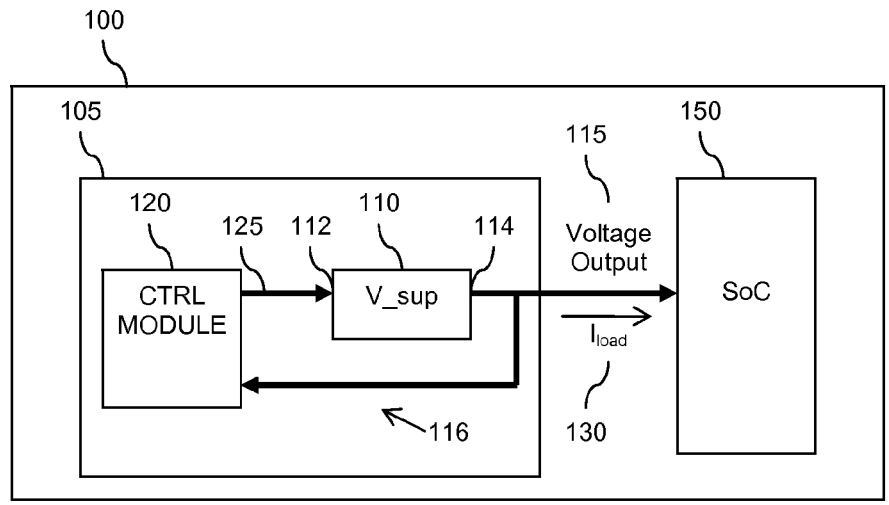
FIG. 1 shows a simplified block diagram of an example of an integrated circuit device.

Referring first to FIG. 1, there is illustrated a simplified block diagram of an example of an integrated circuit device 100 comprising a voltage regulator module 105 arranged to generate a voltage signal 115, which is provided to a load. In the illustrated example, the load comprises a System on Chip (SoC) 150 of the integrated circuit device 100. The voltage regulator module 105 comprises a voltage supply module 110 arranged to receive at an input 112 thereof at least one control signal 125 and to provide at an output 114 thereof the voltage signal 115 in accordance with the received control signal 125. The voltage regulator module 105 further comprises a control module 120 and at least one feedback loop 116 between the output 114 of the voltage supply module 110 and the input 112 of the voltage supply module 110, via the control module 120. The control module 120 is arranged to generate the control signal 125 received at the input 112 of the voltage supply module 110 based at least partly on the voltage level of the voltage signal 115 output by the voltage supply module 110.

By providing an on-chip regulator, such as the regulator 105 illustrated in FIG. 1, with feedback of the relevant output voltage, a high degree of accuracy is typically achievable for the supplied voltage. However, inaccuracy in the output voltage can still occur due to abrupt load changes, which may cause ripples in output voltage. In order to enable such abrupt load changes to be compensated for, and thus to substantially alleviate the problem of ripples in output voltage caused thereby, the control module 120 is further arranged to receive at least one substantially instantaneous indication of a load current 130 at the output of the voltage supply module 110. Based thereon, the control module 120 may apply compensation to the control signal 125 for the voltage supply module 110 based at least partly on the received indication of the load current 130. In this manner, the control module 120 is able to cause the output of the voltage supply module 110 to compensate for any abrupt changes in the load current, advantageously as they are detected, thereby enabling a more reliable voltage level to be maintained at the output 114 of the voltage supply module 110. In particular, in some examples, the control module 120 may be arranged to change an amount of compensation that is applied to the control signal 125 upon detecting a change in the load current 130 greater than a threshold value ΔI, for example a period of time less than a threshold value Δt. In this manner, when a relatively large and abrupt change in load current is detected, the amount of compensation applied to the control signal 125 may be changed to compensate for the change in load current, and thus enable a substantially constant voltage level at the output 114 of the voltage supply module 110 to be maintained.

Figure 2:
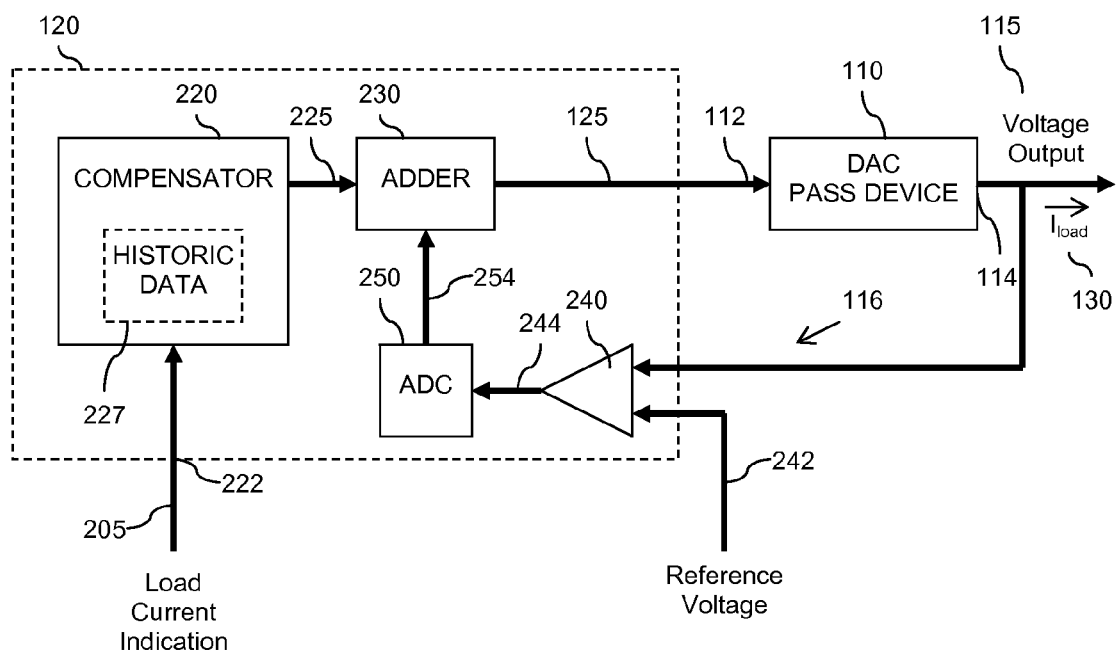
FIG. 2 shows a simplified block diagram of an example of a voltage regulator module.

FIG. 2 illustrates a simplified block diagram of an example of the voltage regulator module 105. The voltage regulator module 105 comprises a voltage supply module 110 arranged to receive at an input 112 thereof at least one control signal 125 and to provide at an output 114 thereof a voltage signal 115 in accordance with the received at least one control signal 125. In the illustrated example of FIG. 2, the voltage supply module 110 comprises a digital to analogue (DAC) pass device, such as a switched mode power supply or the like, arranged to receive one or more digital control signals 125, and to output an analogue signal 115 based at least partly on the received control signal(s) 125.

The voltage regulator module 105 further comprises a control module 120 comprising at least one feedback loop 116 between the output 114 of the voltage supply module 110 and the input 112 of the voltage supply module 110, via the control module 120, wherein the control module 120 is arranged to generate the at least one control signal 125 based at least partly on the voltage level of the voltage signal 115 output by the voltage supply module 110. In the illustrated example of FIG. 2, the feedback loop 116 comprises a comparator 240 arranged to receive at a first input thereof the voltage signal 115 output by the voltage supply module 110. The comparator 240 is further arranged to receive, at a second input thereof, a target reference voltage signal 242, and to perform a comparison of the two received signals 115, 242, and to output a result of the comparison of the two signals. In this manner, the comparator 240 outputs a corrective value 244 that is representative of the difference between the voltage signal 115 output by the voltage supply module 110 and the reference voltage signal 242. The corrective value 244 is then provided to an analogue to digital converter (ADC) 250, which converts the analogue corrective value 244 into a digital corrective value 254, which forms the basis of the control signal 125.

The control module 120 is further arranged to receive at an input 222 thereof at least one indication 205 of the load current 130 at the output 114 of the voltage supply module 110, and to apply a compensation to the at least one control signal 125 for the voltage supply module 110 based at least partly on the received indication(s) 205 of the load current 130. In the illustrated example of FIG. 2, the control module 120 comprises a compensator control component 220 arranged to receive the indication(s) 205 of the load current 130, and to output a compensation value 225 based at least partly on the received indication(s) 205 of the load current 130. The control module 120 further comprises a compensator component 230 within the feedback loop 116, which is arranged to receive the corrective value 254 output by the ADC 250. The compensator component 230 is further arranged to receive the compensation value 225 output by the compensator control component 220, and to apply compensation to the corrective value 254 based at least partly on the received compensation value 225, and to output the compensated corrective value. In particular, for the illustrated example, the compensator component 230 is arranged to add the compensation value 225 to the corrective value 254. The compensated corrective value output by the compensator component 230 is then provided to the voltage supply module 110 as the control signal 125.

The indication 205 of the load current 130 may comprise a value that is directly representative of the load current 130. For example, a resistive element (not shown) may be provided within the voltage supply path between the output 114 of the voltage supply module 110 and the load, say SoC 150 of FIG. 1, and the voltage drop across the resistive element may be measured to provide the indication 205 of the load current. In this manner, an accurate and substantially instantaneous indication of the load current 130 may be obtained. The control module 120 may thus be arranged to compare an indicated load current value derived from the received indication 205 of the load current 130 to historic load current data 227 such as a moving average value, and to apply compensation to the control signal 125 based at least partly on the result of said comparison. For clarity, a moving average may comprise, for example, a type of finite impulse response filter used to analyze a set of data points by creating a series of averages of different subsets of the full data set. Thus, such a moving average may be based on a data set comprising historic load current values, for example as derived from one or more previously received indication(s) 205 of the load current 130. In this manner, the indications of the actual load current and historic data therefor may be utilised to provide an accurate assessment of the load current 130, whilst accurately taking into account any changes in the load current that could cause ripples, etc., in the output voltage signal 115.

A disadvantage of utilising indications of the actual current load 130 in this manner may be the need to provide a resistive element within the voltage supply path, which will result in a voltage drop across the resistive element. Furthermore, a connection of a bypass capacitor, in order to minimise any effect of such a voltage drop, introduces additional anomalies into the system.

Thus, and in accordance with some alternative example embodiments, the indication 205 of the load current 130 may alternatively comprise a substantially instantaneous indication of load activity. For example, such an indication of load activity may comprise an indication of one or more of: a load circuit operating frequency; a load circuit clock logical gating state; a load circuit bus status; enabling/disabling of one or more on-die modules; change of functional mode; change of power mode; etc.

The control module 120 may therefore be arranged to compare such an indication of load activity to historic load activity data 227 and to apply compensation to the control signal 125 based at least partly on the result of said comparison. In this manner, any changes detected in the load activity that would result in, for example, an abrupt increase or decrease in load current 130, may trigger the control module 120 to apply a suitable compensation to the control signal 125 in order to enable a substantially constant voltage level at the output 114 of the voltage supply module 110 to be maintained.

Since the feedback loop 116 of the control module 120 is arranged to generally maintain the voltage level of the output signal 115 at the desired level, the load current indication 205 is not required to provide an indication of the absolute load current value. The load current indication 205 need only provide sufficient information for detecting or predicting sufficiently large and abrupt changes in the load current 130 that may result in ripples in the voltage level of the output signal 115, and thus for which compensation would be beneficial.

In some examples, the use of one or more substantially instantaneous indications of the load current at the output of the voltage supply module in this manner may enable compensation to be provided to the control signal of the voltage supply module in an almost pre-emptive manner. Accordingly, compensation for abrupt changes in the load current may be provided substantially simultaneously with such load current changes being experienced at the output of the voltage supply module. As such, ripples in the output signal of the voltage supply module due to abrupt changes in the load current may be significantly reduced as compared with traditional voltage regulators that are limited to reacting to the changes in the output voltage caused by such changes in load current.

In the illustrated example, the information about the load current 130, and the compensation to be applied to the control signal 125, is derived and implemented within a digital domain, with the voltage supply module 110 comprising a digital to analogue element, and the feedback loop 116 comprising a digital to analogue converter. However, in other examples, the inventive concept herein described may be applied to any type of voltage regulator, and is not limited to being implemented within a digital domain as in the illustrated example.

Figure 3:
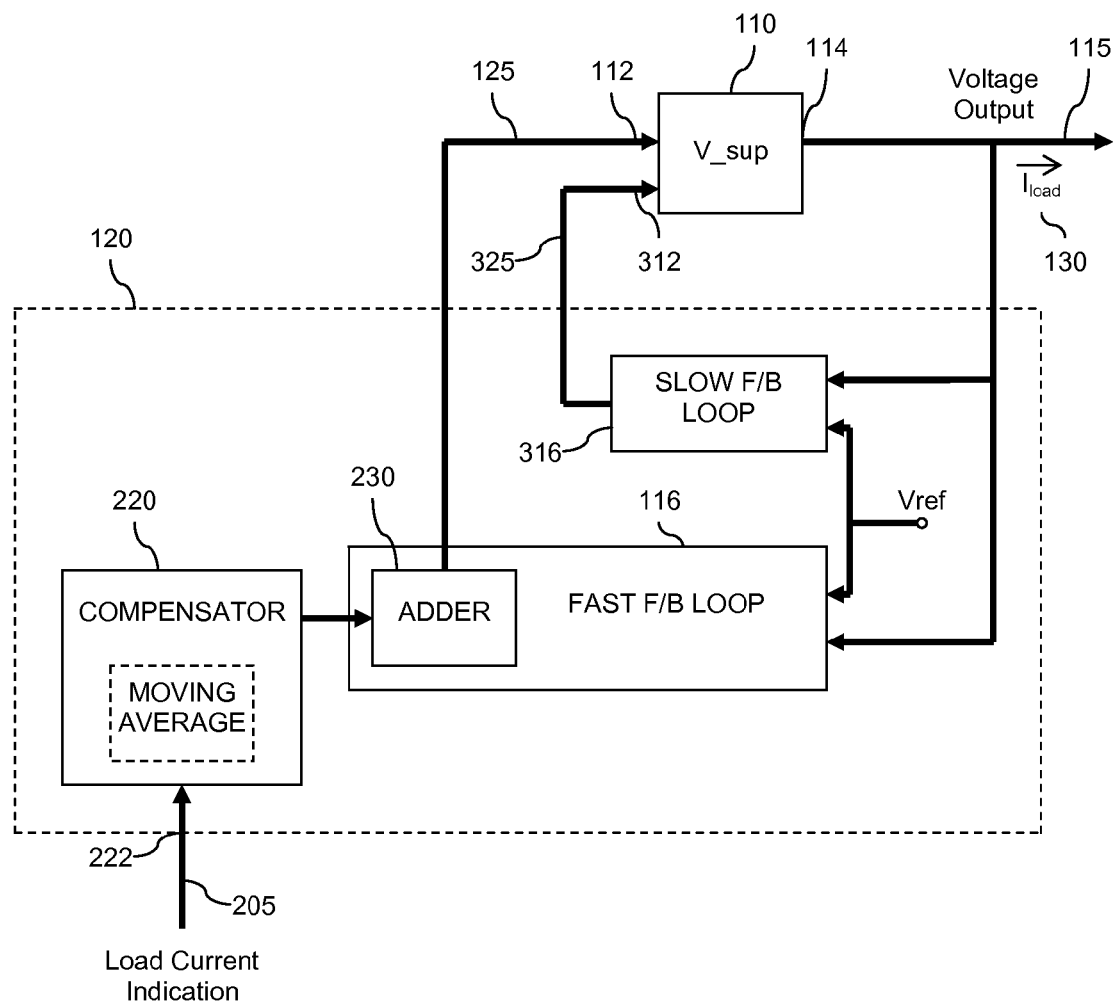
FIG. 3 shows a simplified block diagram of an alternative example of a voltage regulator module.

Referring now to FIG. 3 there is illustrated a simplified block diagram of an alternative example of a voltage regulator module 105. In the example illustrated in FIG. 3, the voltage regulator module 105 comprises a voltage supply module 110 arranged to receive at a first input 112 thereof a first, faster reaction control signal 125. The voltage supply module 110 is further arranged to receive at a further input 312 thereof at least one further, slower reaction control signal 325, and to provide at an output 114 thereof a voltage signal 115 in accordance with the received control signals 125, 325.

The voltage regulator module 105 further comprises a control module 120 comprising a first, faster feedback loop 116 between the output 114 of the voltage supply module 110 and the first input 112 of the voltage supply module 110, wherein the control module 120 is arranged to generate the at least first, faster reaction control signal 125 based at least partly on the voltage level of the voltage signal 115 output by the voltage supply module 110. For example, the first, faster feedback loop 116 may comprise a high comparator gain. The control module 120 further comprises a further, slower feedback loop 316 between the output 114 of the voltage supply module 110 and the further input 312 of the voltage supply module 110. The control module 120 is arranged to generate that at least one further, slower reaction control signal 325 based at least partly on the voltage level of the voltage signal 115 output by the voltage supply module 110. For example, the further, slower feedback loop 316 may comprise a lower comparator gain.

The control module 120 is further arranged to receive at an input 222 thereof at least one indication 205 of the load current 130 at the output 114 of the voltage supply module 110, and to apply a compensation to the first, faster reaction control signal 125 for the voltage supply module 110 based at least partly on at least one received indication(s) 205 of the load current 130. In this manner, by applying the compensation to the faster reaction control signal 125, the compensation may be more effectively (i.e. more quickly) applied to the output signal 115.

Figure 4:
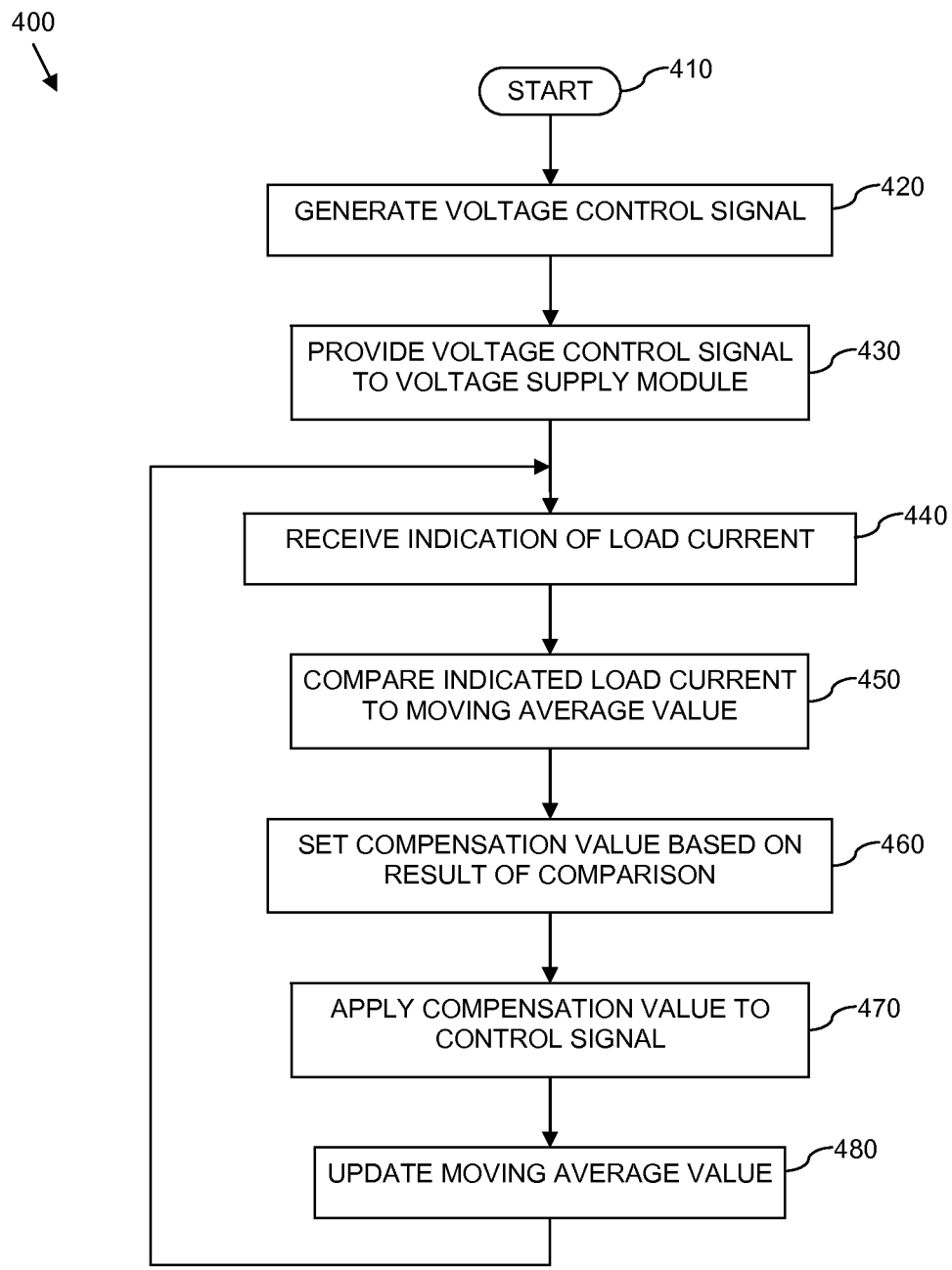
FIG. 4 shows a simplified flowchart of an example of a method for compensating a voltage signal output by a voltage supply module.

Referring now to FIG. 4, there is illustrated a simplified flowchart 400 of an example of a method for compensating a voltage signal that is output by a voltage supply module, such as may be implemented within the voltage regulator 105 of any of FIGS. 1 to 3. The method starts at 410, and moves on to 420 where a control signal for the voltage supply module is generated, based at least partly on a voltage level of the voltage signal output by the voltage supply module, such as control signal 125. The voltage signal is then provided to the voltage supply module at 430 in order to regulate the voltage level of the voltage signal output by the voltage supply module. Next, at 440, an indication of a load current at the output of the voltage supply module is received. The indicated load current, derived from the received indication, is then compared to historic load current data, which for the illustrated example comprises a moving average value, at 450. A compensation value is then set, at 460, based at least partly on the result of the comparison performed at 450. The compensation value is then applied to the control signal provided to the voltage supply module, at 470 and the moving value updated at 480. The method then loops back to 440.

Figure 5:
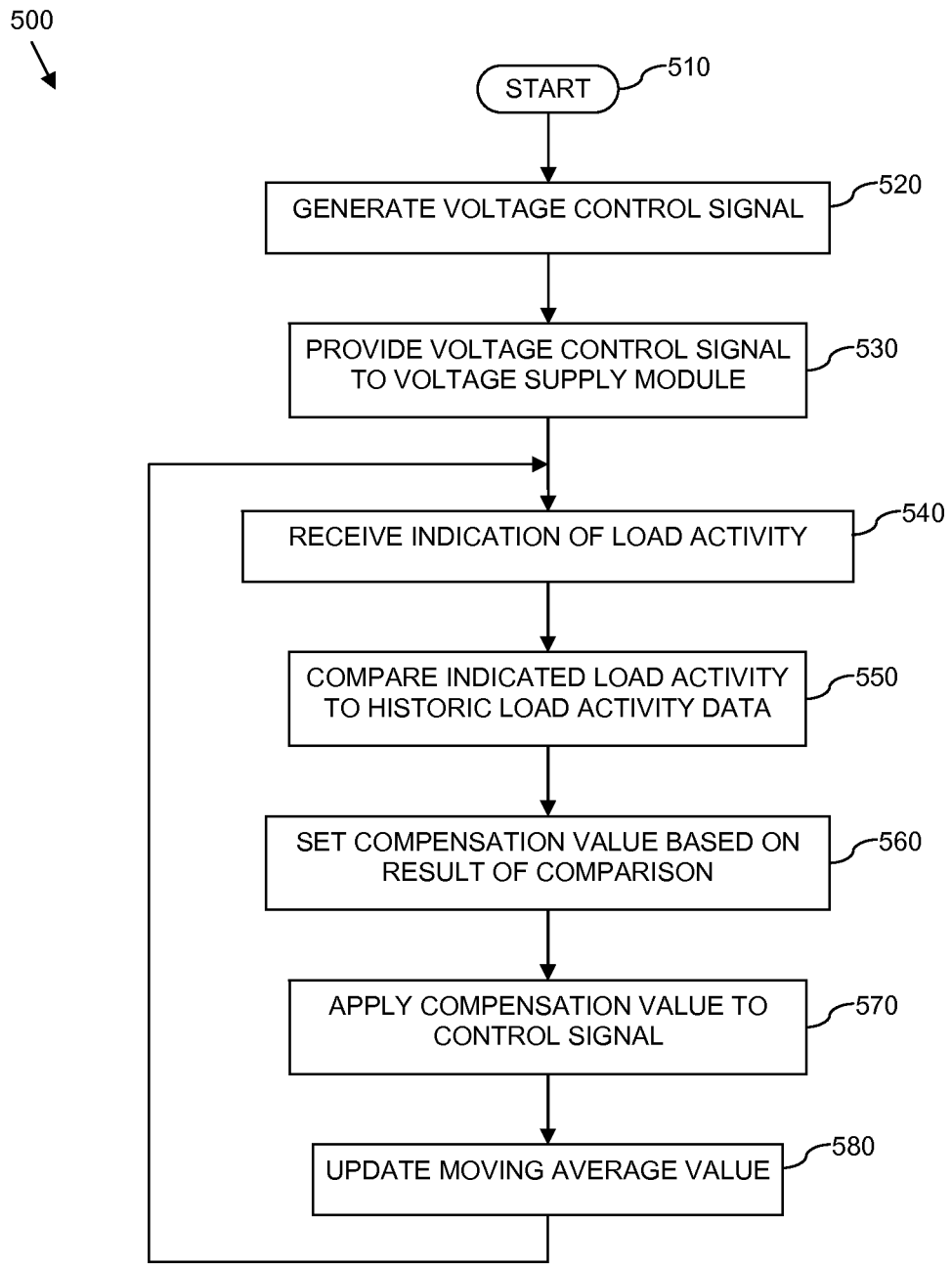
FIG. 5 shows a simplified flowchart of an alternative example of a method for compensating a voltage signal output by a voltage supply module.

Referring now to FIG. 5, there is illustrated a simplified flowchart 500 of an alternative example of a method for compensating a voltage signal output by a voltage supply module, such as may be implemented within the voltage regulator 105 of FIGS. 1 to 3. The method starts at 510, and moves on to 520 where a control signal for the voltage supply module is generated based at least partly on a voltage level of the voltage signal output by the voltage supply module, such as control signal 125. The voltage signal is then provided to the voltage supply module at 530 in order to regulate the voltage level of the voltage signal output by the voltage supply module. Next, at 540, an indication of load activity is received. The indicated load activity is then compared to historic load activity data, at 550. A compensation value is then set, at 560, based at least partly on the result of the comparison performed at 550. The compensation value is then applied to the control signal provided to the voltage supply module, at 580. The method then loops back to 540.

Because the illustrated embodiments of the present invention may for the most part, be implemented using electronic components and circuits known to those skilled in the art, details have not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the compensator control module 220 and the compensator module 230 have been illustrated as separate functional blocks with FIGS. 2 and 3 for clarity. However, it will be appreciated that these functional elements may equally be implemented within a single functional block.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
    at least one voltage supply module arranged to receive at an input thereof at least one control signal and to provide at an output thereof a voltage signal in accordance with the received at least one control signal; and
    at least one control module comprising at least one feedback loop between the output of the at least one voltage supply module and the input of the at least one voltage supply module, and arranged to generate the at least one control signal based at least partly on the voltage level of the voltage signal output by the at least one voltage supply module;
    wherein the at least one control module is further arranged to receive at an input thereof at least one instantaneous indication of a load current at the output of the at least one voltage supply module and to apply a compensation value to the at least one control signal provided to the at least one voltage supply module based at least partly on the received at least one indication of the load current, wherein the indication of the load current comprises an indication of load activity that is selected from a group consisting of: a load circuit operating frequency; and a load circuit clock logical gating state.

2. The integrated circuit device of claim 1 wherein the at least one control module is arranged to change an amount of compensation applied to the at least one control signal upon detecting a change in the load current greater than a threshold value.

3. The integrated circuit device of claim 1 wherein the at least one control module is arranged to change an amount of compensation applied to the at least one control signal upon detecting a change in the load current over a period of time less than a threshold value.

4. The integrated circuit device of claim 1 wherein the at least one control module is arranged to compare an indicated load current value derived from the received at least one indication of the load current to a moving average value, and to apply the compensation value to the at least one control signal based at least partly on a result of said comparison.

5. The integrated circuit device of claim 1 wherein the at least one control module is arranged to compare the indication of load activity to historic load activity data and to apply the compensation value to the at least one control signal based at least partly on a result of said comparison.

6. The integrated circuit device of claim 1 wherein the group further consists of:
    a load circuit bus status;
    enabling/disabling of one or more on-die modules;
    a change of functional mode; and
    a change of power mode.

7. The integrated circuit device of claim 1 wherein the at least one control module comprises a compensator control component arranged to receive the at least one indication of the load current and to output a second compensation value based at least partly on the received at least one indication of the load current; wherein the at least one control module further comprises a compensator component within the at least one feedback loop, and arranged to receive the second compensation value output by the compensator control component, and to apply the compensation value to the at least one control signal based at least partly on the received compensation value.

8. The integrated circuit device of claim 1 wherein:
    the at least one voltage supply module is arranged to receive at a first input a first, faster reaction control signal and receive at an at least one further input thereof an at least one further, slower reaction control signal, and based thereon to provide at an output thereof a voltage signal in accordance with the received control signals.

9. The integrated circuit device of claim 8 wherein the at least one control module is arranged to apply the compensation value to at least the first, faster reaction control signal for the at least one voltage supply module based at least partly on the received indication of the load current.

10. A voltage regulator module comprising:
    at least one voltage supply module arranged to receive at an input thereof at least one control signal and to provide at an output thereof a voltage signal in accordance with the received at least one control signal; and
    at least one control module comprising at least one feedback loop between the output of the at least one voltage supply module and the input of the at least one voltage supply module, and arranged to generate the at least one control signal based at least partly on the voltage level of the voltage signal output by the at least one voltage supply module;

wherein the at least one control module is further arranged to:

receive at an input thereof at least one instantaneous indication of a load current at the output of the at least one voltage supply module; and apply a compensation value to the at least one control signal provided to the at least one voltage supply module based at least partly on the received at least one indication of the load current, wherein the indication of the load current comprises an indication of load activity that is selected from a group consisting of: a load circuit operating frequency; and a load circuit clock logical gating state.

11. A method for compensating a voltage supply signal output by a voltage supply module, the method comprising:

generating at least one control signal based at least partly on a voltage level of the voltage supply signal; and providing the at least one control signal to the voltage supply module, where the method further comprises:

receiving at least one instantaneous indication of a load current at the output of the voltage supply module for the voltage supply signal; and applying a compensation value to the at least one control signal based at least partly on the at least one received indication of the load current, wherein the indication of the load current comprises an indication of load activity that is selected from a group consisting of: a load circuit operating frequency, and a load circuit clock logical gating state.

12. The integrated circuit device of claim 2 wherein the at least one control module is arranged to change an amount of compensation applied to the at least one control signal upon detecting a change in the load current over a period of time less than a threshold value.

13. The integrated circuit device of claim 2 wherein the at least one control module is arranged to compare an indicated load current value derived from the received at least one indication of the load current to a moving average value, and to apply the compensation value to the at least one control signal based at least partly on a result of said comparison.

14. The integrated circuit device of claim 3 wherein the at least one control module is arranged to compare an indicated load current value derived from the received at least one indication of the load current to a moving average value, and to apply the compensation value to the at least one control signal based at least partly on a result of said comparison.

15. The integrated circuit device of claim 2 wherein the at least one control module is arranged to compare the indication of load activity to historic load activity data and to apply the compensation value to the at least one control signal based at least partly on a result of said comparison.

16. The integrated circuit device of claim 3 wherein the at least one control module is arranged to compare the indication of load activity to historic load activity data and to apply the compensation value to the at least one control signal based at least partly on a result of said comparison.

17. The integrated circuit device of claim 2 wherein the at least one control module comprises a compensator control component arranged to receive the at least one indication of the load current and to output a second compensation value based at least partly on the received at least one indication of the load current; wherein the at least one control module further comprises a compensator component within the at least one feedback loop, and arranged to receive the second compensation value output by the compensator control component, and to apply the compensation value to the at least one control signal based at least partly on the received compensation value.

18. The integrated circuit device of claim 3 wherein the at least one control module comprises a compensator control component arranged to receive the at least one indication of the load current and to output a second compensation value based at least partly on the received at least one indication of the load current; wherein the at least one control module further comprises a compensator component within the at least one feedback loop, and arranged to receive the second compensation value output by the compensator control component, and to apply the compensation value to the at least one control signal based at least partly on the received compensation value.

19. The voltage regulator module of claim 10 wherein:

the at least one voltage supply module is arranged to receive at a first input a first, faster reaction control signal and receive at an at least one further input thereof an at least one further, slower reaction control signal, and based thereon to provide at an output thereof a voltage signal in accordance with the received control signals.

20. The method of claim 11 wherein:

the at least one voltage supply module is arranged to receive at a first input a first, faster reaction control signal and receive at an at least one further input thereof an at least one further, slower reaction control signal, and based thereon to provide at an output thereof a voltage signal in accordance with the received control signals.

* * * * *